Patented Apr. 8, 1930

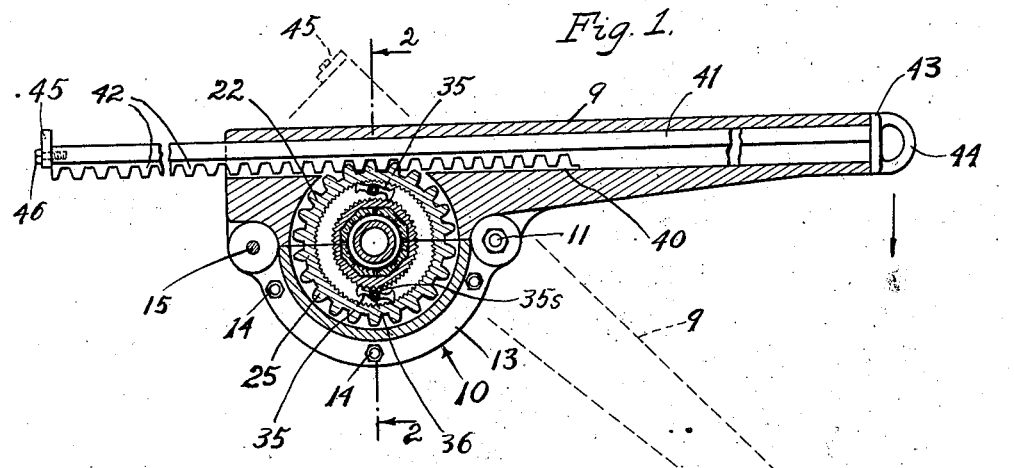
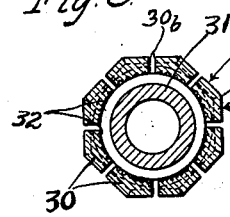
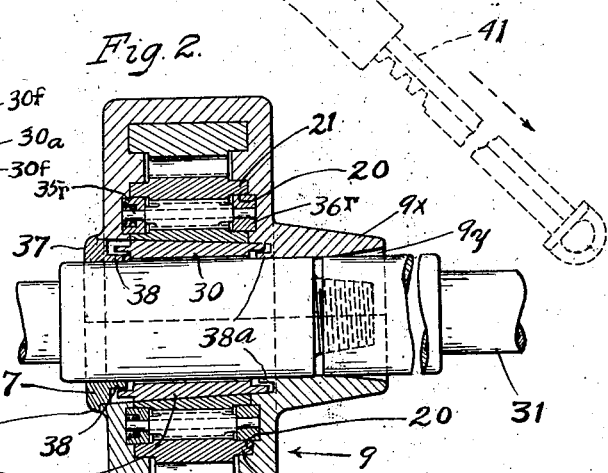
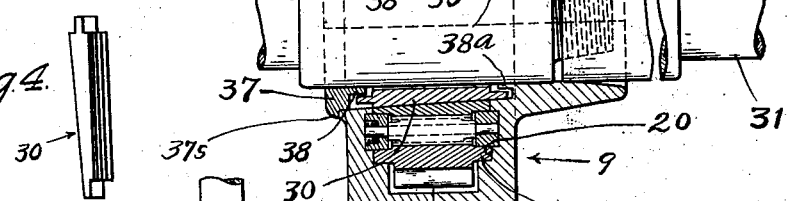
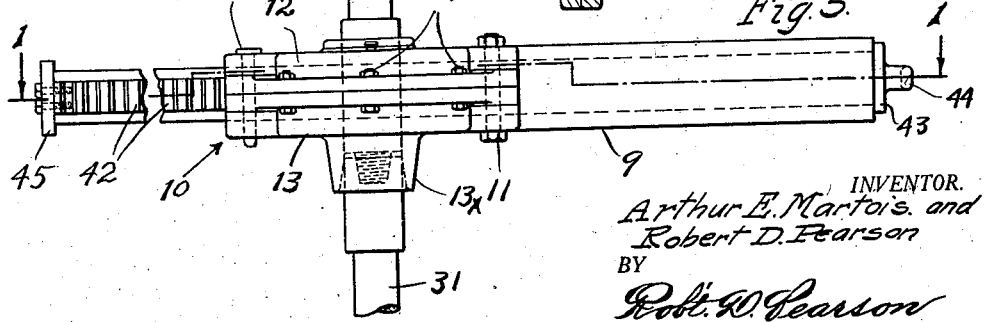

1,753,244

UNITED STATES PATENT OFFICE

ARTHUR E. MARTOIS, OF COMPTON, AND ROBERT D. PEARSON, OF LOS ANGELES, CALIFORNIA

UNSCREWING ATTACHMENT FOR DRILL PIPE

Application filed February 16, 1929. Serial No. 340,624.

This invention relates to an apparatus for more efficiently applying power to a drill pipe for the purpose of screwing together or unscrewing the joints thereof.

An object of the invention is to provide improved means whereby the power is applied to such joints with a greater leverage at the beginning of the unscrewing movement to loosen a joint, and with a less leverage but greater speed after the joint has been turned sufficiently to loosen the same.

A further object of the invention is to provide an improved gripping device which will very effectively grapple the parts to be screwed or unscrewed and which will automatically fasten itself securely to such part in whichever direction it is rotated.

Other objects and advantages may hereinafter appear.

Referring to the accompanying drawings which illustrate a preferred embodiment of the invention, Fig. 1 is a transverse section on line 1—1 of Fig. 5, one position of the device being indicated by dotted lines.

Fig. 2 is a vertical section on line 2—2 of Fig. 1, showing also a fragment of the drill pipe line to which the device is being applied.

Fig. 3 is an enlarged transverse section of the gripping slips shown in the central portion of Fig. 1.

Fig. 4 is a side elevation of one of the gripping slips.

Fig. 5 is a side elevation of the parts shown in Fig. 1.

Referring in detail to the drawings, the housing comprises a main section 9 and the gate portion 10, said gate portion being pivotally secured to the body portion 9 by means of a pivot pin or bolt 11. As well shown in Fig. 5, said gate portion 10 is composed of an upper part 12 and a lower part 13 said parts being secured together by the tie bolts 14. When said gate 10 is swung to its closed position its free end may be secured to the body portion of the housing by means of a fastening pin 15.

The body portion of the housing is provided on each of its opposed inner faces with a semi-circular groove 20 to receive a semi-circular rib 21 which projects from the half-gear 22, it being understood that the gate portion 10 is to be provided with a like groove, and the complementary half-gear 25 is also provided with a rib to seat slidably in the last mentioned groove so that when the complementary gear parts are in their operative position, a complete rotative gear will be housed within the device.

The complete gear which has been described is of an annular form and encircles a plurality of circumferentially arranged spaced gripping slips 30 which, in turn, surround the drill pipe line 31 and which are provided on their inner surfaces with teeth 32 adapted to grip the joint of said drill pipe line which is to be screwed into place, or unscrewed from the tool pipe line when the device is operated.

Said slips 30 are tapered longitudinally as shown to cause them to drop into a position for firm gripping. Said gripping slips 30 are thicker at their mid-widths than at their sides, their exterior faces 30$^f$ meeting at an obtuse angle 30$^a$ in order to adapt them to rock transversely and thus perform their gripping function in whichever direction the device is rotated. The reduced end portions of these slips are fitted into place as shown in Fig. 2. Spaces 30$^b$ between slips 30 provide room for their operation.

Between the gripping slips 30 and the annular gear sections 22 and 25 are interposed a plurality of dogs 35 pivoted at their midlengths on pins 36 so as to swing in a plane at right angles to the axis of the tool line. Said dogs are normally held in their operative position by springs 35$^s$ coiled around their pivots.

Retaining rings 35$^r$ and 36$^r$ are provided to retain the dogs 35 in their operative positions. The ring 35$^r$ is recessed as shown, in order to provide room for the dog springs 35$^s$.

There is provided for the upper end of the device, when viewed in the operative position, a retaining and bearing cap 37 having an internally projecting attaching flange 38 whereby it holds slips 30 in position as shown in Fig. 2. It is in two parts like the gears. Said cap 37 has a peripheral stop flange 37$^s$.

With its flange 38 cooperates another flange 38ª at the opposite side of the housing, the reduced outer end portions of said slips 30 projecting beyond said flanges for the purpose of retaining said slips in their operative positions.

The body portion 9 of the housing is of an elongated form and is provided with an internal guide passage 40 which extends from end to end thereof. Within said guide passage 40 is slidably mounted a rack bar 41 having a toothed portion 42 which operatively engages the teeth of the gear formed by the gear halves 22 and 25. The outer end of said rack bar 41 is provided with a head 43 having an attaching handle or stirrup 44, whereby it may be secured to any suitable operating device, not shown.

As viewed in Fig. 1, the left end of the rack bar 41 is provided with a stop element, desirably a plate or clip 45 which is attached thereto by a screw 46 and which abuts against the left end of the housing body 9 when the rack is fully extended as indicated in dotted lines in this view.

The body portion of the housing 9 is provided with a semi-circular extension or tapering flange 9ˣ, and the lower part 13 of the gate 10 is provided with a like extension or flange 13ˣ adapted to complement said extension 9ˣ and thus form, when the gate is closed, a sleeve-like extension having therewithin an inwardly tapering recess 9ʸ of sufficient depth still to encircle the upper end of the tool pipe line after a joint has been unscrewed therefrom. This construction, well shown in Fig. 2, prevents the tool pipe line from toppling over from one side to the other immediately after a joint has been removed from its upper end.

In assembling the parts, while the gate 10 is open and the rack bar in the position shown in full lines in Fig. 1, the half-gear 22 is placed in the position shown in this view, then half the slips 32 are inserted. Then the corresponding gear half 25 and remaining half of the slips are put in place within the gate, after which the gate may be swung to its closed position around the tool line as shown in Fig. 1. Before the rotatable parts can conveniently be removed they must also be brought back to the position shown in Fig. 1 wherein one half-gear is contained within the gate of the housing and the other half-gear is contained within the body portion of the housing.

In operation, assuming the parts to be in the positions shown in full lines in Fig. 1, wherein the gate 10 has been swung to its closed position and fastened in that position by means of the latch pin 15, power will be applied from the engine in such a manner as to produce traction upon the stirrup 44 in the direction indicated by the arrow in the upper right hand portion of this view. The first effect of this traction will be to produce a powerful rotary movement of the device causing it more firmly to grip the tool pipe line and thereby loosen toward an unscrewed position the particular tool joint to which it is applied, then farther traction upon the device will move the rack bar 41 longitudinally toward the position shown in dotted lines in Fig. 1. It will be seen that in this manner a powerful leverage is secured for the initial rotary movement to loosen the part to be unscrewed, the leverage being lessened but the speed of movement increased during the latter part of operation.

Claims:

1. A drill pipe wrench comprising a two-part housing, adapted for mounting upon a rotatable pipe, or coupling, gripping means, and means for rotating the latter; each part of said housing having a substantial extension projecting axially beyond the zone of action of the gripping means and formed to enclose and maintain a section of the pipe not gripped by the gripping means in line with the portion or coupling so gripped.

2. A pipe wrench comprising a housing adapted for mounting upon a rotatable pipe, or coupling, gripping means adapted to grip said pipe or coupling and comprising a gear-wheel, a rack operatively engaging said gear-wheel, and a hollow handle within which said rack is slidable, said handle forming an extension of said housing and said rack having a portion which projects beyond said housing and is at all times accessible for the purpose of attaching means thereto to impart a combined traction and swinging force to said rack.

In testimony whereof we affix our signatures.

ARTHUR E. MARTOIS.
ROBERT D. PEARSON.